United States Patent
Tamura

(10) Patent No.: US 7,296,865 B2
(45) Date of Patent: Nov. 20, 2007

(54) LIQUID EJECTION METHOD, COMPUTER-READABLE MEDIUM, LIQUID EJECTION APPARATUS, AND LIQUID EJECTION SYSTEM

(75) Inventor: Noboru Tamura, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 170 days.

(21) Appl. No.: 11/305,016

(22) Filed: Dec. 19, 2005

(65) Prior Publication Data
US 2007/0019013 A1   Jan. 25, 2007

(30) Foreign Application Priority Data
Dec. 21, 2004   (JP) .............................. 2004-369971

(51) Int. Cl.
*B41J 29/38* (2006.01)
(52) U.S. Cl. .............................. 347/12; 347/10; 347/11
(58) Field of Classification Search .................. 347/10, 347/11, 12, 15, 56, 57
See application file for complete search history.

(56) References Cited

U.S. PATENT DOCUMENTS

2002/0180815 A1 * 12/2002 Nou ............................ 347/10
2005/0057588 A1 * 3/2005 Umeda ......................... 347/10
2006/0197790 A1 * 9/2006 Ito et al. ....................... 347/10
2006/0268032 A1 * 11/2006 Ito ............................... 347/10

FOREIGN PATENT DOCUMENTS

| JP | 2-77793 A | 3/1990 |
| JP | 2001-47646 A | 2/2001 |
| JP | 2001-232774 A | 8/2001 |

* cited by examiner

*Primary Examiner*—Lamson Nguyen
(74) *Attorney, Agent, or Firm*—Sughrue Mion, PLLC

(57) ABSTRACT

A liquid ejection method includes outputting liquid ejection data and a first clock signal. The liquid ejection data is associated with nozzle groups having plural nozzles arranged in a predetermined order. The liquid ejection data is taken successively to a second shift register in synchronization with the first clock signal. The liquid ejection data is latched, in synchronization with the first clock signal after the predetermined number of the liquid ejection data has been taken into the second shift register. Subsequently, the latched liquid ejection data is sent to a first shift register corresponding to the respective nozzle groups, in synchronization with a second clock signal generated from the first clock signal. The method includes driving an element based on the liquid ejection data that has been taken into the first shift register.

8 Claims, 8 Drawing Sheets

LIQUID EJECTION METHOD, COMPUTER-READABLE MEDIUM, LIQUID EJECTION APPARATUS, AND LIQUID EJECTION SYSTEM

CROSS-REFERENCE TO RELATED APPLICATIONS

The present application claims priority upon Japanese Patent Application No. 2004-369971 filed on Dec. 21, 2004, which is herein incorporated by reference.

BACKGROUND

1. Technical Field

The present invention relates to liquid ejection methods, computer-readable media, liquid ejection apparatuses, and liquid ejection systems.

2. Related Art

Inkjet printers are known as an example of liquid ejection apparatuses that eject droplets of a liquid. Inkjet printers carry out printing by ejecting ink from nozzles according to print data while moving a carriage, which is equipped with nozzle groups having a plurality of nozzles provided with elements for ejecting liquid, in a predetermined direction. In these inkjet printers, a drive section for receiving print data and driving the elements is provided for each nozzle group and ordinarily each of these drive sections is made of a single integrated circuit and mounted on the carriage in the same number as there are nozzle groups.

A controller that inputs the print data to the drive sections is fixed to a main unit area of the printer, and the controller and each of the drive sections are connected by a cable such as an FFC having core wires provided corresponding to the drive sections. Thus, the print data is sent to each of the drive sections as serial data.

That is to say, the print data is inputted from the controller to the drive sections via the cable, and printing is carried out by ejecting ink from the nozzles according to the print data that is inputted to the drive sections while the carriage equipped with the plurality of nozzle groups is moved in the predetermined direction.

The number of nozzle groups provided in inkjet printers has increased in recent years to support increased image quality of an image and faster printing speeds. Accordingly, the number of core wires in the cable connecting the controller and the drive sections has increased, thereby making the cable width wider which contributes to increased printer size, and increasing the burden on the carriage due to cable bending, so that it has become more difficult to move the carriage smoothly. Accordingly, thought has been given to transferring the print data that is to be inputted to the plurality of drive sections as serial multiplexed data from the controller to the drive sections using a single core wire (see JP 2001-232774A).

However, when transferring the print data which corresponds to a plurality of nozzle groups, as serial multiplexed data from the controller to the drive sections using a single core wire, there is a risk that the print data will deteriorate or that unnecessary data will be taken in due to such factors as the timing for converting the serial multiplexed data to serial data for each drive section.

SUMMARY

The present invention was arrived at in light of the foregoing issues, and it is an object thereof to provide a liquid ejection method, a computer-readable medium, a liquid ejection apparatus, and a liquid ejection system capable of converting inputted serial data into serial data in an appropriate drive section unit corresponding to each of the drive sections without deterioration of print data or taking in unnecessary data.

A primary aspect of the invention for achieving the aforementioned object is a liquid ejection method such as the following.

A liquid ejection method, comprising:

outputting from a controller a liquid ejection data string and a first clock signal, the liquid ejection data string having liquid ejection data for ejecting a liquid from a nozzle, the liquid ejection data being associated with each of at least two nozzle groups having a plurality of the nozzles each provided with an element for ejecting the liquid, being of a number equivalent to a number of the nozzles of the nozzle groups, and being arranged in a predetermined order, and the liquid ejection data string having, in between each of the liquid ejection data associated with a predetermined nozzle group, one each of the liquid ejection data associated with another nozzle group arranged in a prearranged order;

taking in a predetermined number of the liquid ejection data successively from the liquid ejection data string to a second shift register in synchronization with the first clock signal;

latching in a latching circuit the liquid ejection data of a number equivalent to the number of the nozzle groups, including the liquid ejection data taken in to the second shift register, in synchronization with the first clock signal outputted after the predetermined number of the liquid ejection data has been taken in to the second shift register;

after the liquid ejection data has been latched in the latching circuit, taking in the liquid ejection data that is latched in the latching circuit, by the number of the nozzles of the nozzle groups, to a first shift register corresponding to the respective nozzle groups for holding the liquid ejection data together in the predetermined order, in synchronization with a second clock signal generated based on the first clock signal;

stopping output of the first clock signal after the final liquid ejection data of the liquid ejection data string is taken into the first shift register and before the second clock signal is generated; and driving the element based on the liquid ejection data that has been taken in to the first shift register.

Features and objects of the present invention other than the above will be made clear by reading the present specification with reference to the accompanying drawings.

Figure 1:
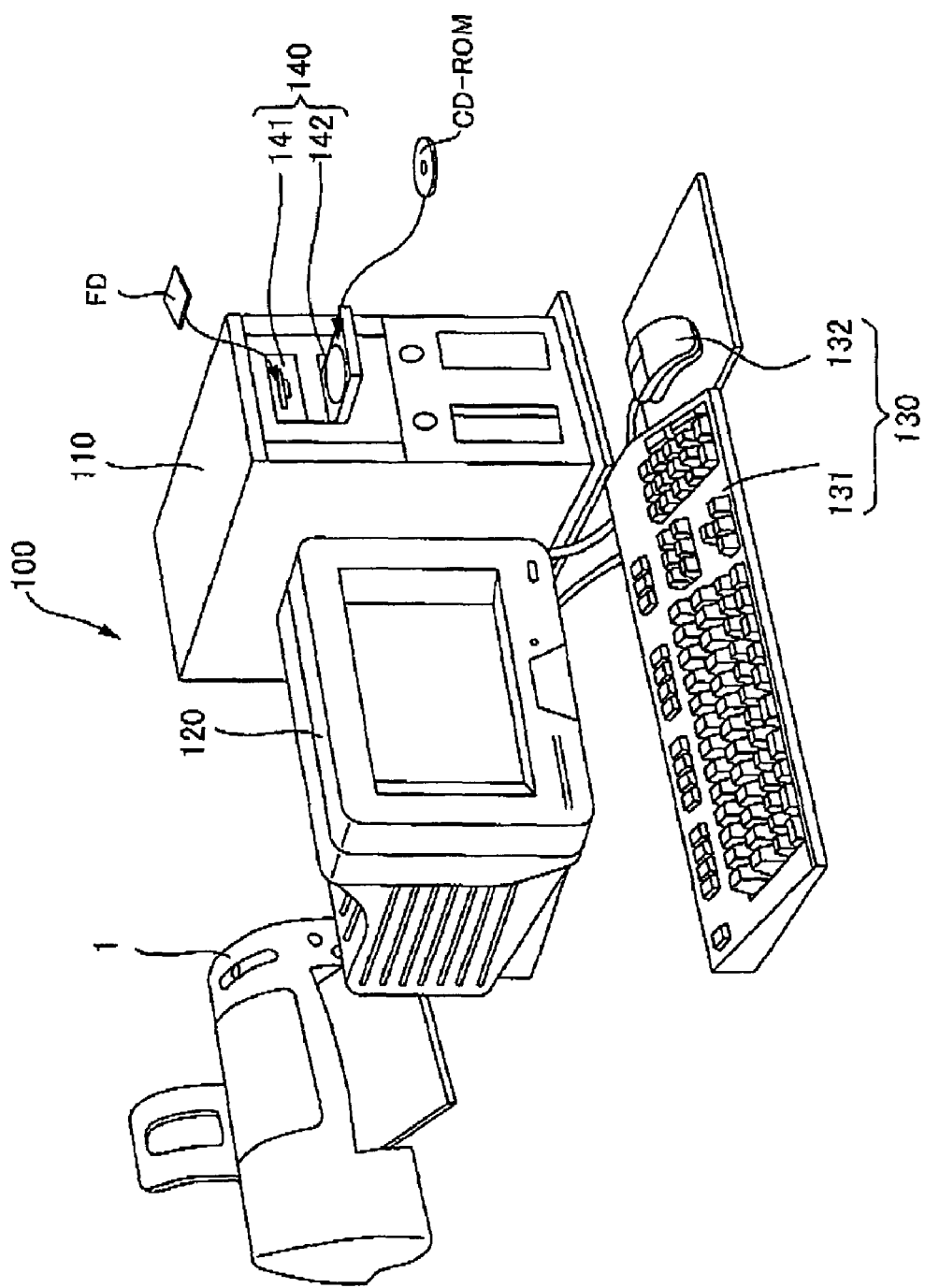
FIG. 1 is a diagram that describes a configuration of the printing system.

For a more complete understanding of the present invention and the advantages thereof, reference is now made to the following description taken in conjunction with the accompanying drawings.

DESCRIPTION OF EXEMPLARY EMBODIMENTS

At least the following matters will be made clear by the explanation in the present specification and the description of the accompanying drawings.

A liquid ejection method, comprising:
  outputting from a controller a liquid ejection data string and a first clock signal,
    the liquid ejection data string having liquid ejection data for ejecting a liquid from a nozzle,
    the liquid ejection data being associated with each of at least two nozzle groups having a plurality of the nozzles each provided with an element for ejecting the liquid, being of a number equivalent to a number of the nozzles of the nozzle groups, and being arranged in a predetermined order, and
    the liquid ejection data string having, in between each of the liquid ejection data associated with a predetermined nozzle group, one each of the liquid ejection data associated with another nozzle group arranged in a prearranged order;
  taking in a predetermined number of the liquid ejection data successively from the liquid ejection data string to a second shift register in synchronization with the first clock signal;
  latching in a latching circuit the liquid ejection data of a number equivalent to the number of the nozzle groups, including the liquid ejection data taken in to the second shift register, in synchronization with the first clock signal outputted after the predetermined number of the liquid ejection data has been taken in to the second shift register;
  after the liquid ejection data has been latched in the latching circuit, taking in the liquid ejection data that is latched in the latching circuit, by the number of the nozzles of the nozzle groups, to a first shift register corresponding to the respective nozzle groups for holding the liquid ejection data together in the predetermined order, in synchronization with a second clock signal generated based on the first clock signal;
  stopping output of the first clock signal after the final liquid ejection data of the liquid ejection data string is taken in to the first shift register and before the s:second clock signal is generated; and
  driving the element based on the liquid ejection data that has been taken in to the first shift register.

With this liquid ejection method, although the first clock signal from the controller is outputted even after the final liquid ejection data in the liquid ejection data string is taken into the first shift register, after the final liquid ejection data has been taken into the first shift register, output of the first clock signal is stopped before the second clock signal is generated. Accordingly, the second clock signal is not generated after the final liquid ejection data of the liquid ejection data string is taken into the first shift register. Therefore, the data that is latched in the latching circuit after the final liquid ejection data has been taken into the first shift register is not taken into the first shift register. That is, even if any data is taken into the second shift register after the final liquid ejection data in the liquid ejection data string are taken into the first shift register, the data that has been taken in cannot be taken into the first shift register. Accordingly, the final liquid ejection data in the liquid ejection data string is taken into the first shift register until the final items and since data after this is not taken in, it is possible to take into the first shift register only the appropriate liquid ejection data. Then, liquid can be ejected appropriately based on the appropriate liquid ejection data that is taken into the first shift register.

In this liquid ejection method,
  the liquid ejection data string outputted from the controller is taken in to the first shift register which is arranged movably relative to the controller via a cable.

With this liquid ejection method, liquid ejection data corresponding to the nozzle groups can be outputted as a liquid ejection data string when outputting the liquid ejection data from the controller to at least two nozzle groups. Accordingly, the number of core wires of the cable that connects the controller and the first shift register for outputting the liquid ejection data can be a single wire only even when a plurality of nozzle groups are provided, and therefore the width of the cable can be made narrow. Therefore, the liquid ejection apparatus can be made more compact. Also, because a cable having a small number of core wires can bend easily, it is possible to reduce the burden incurred in moving the nozzle groups, and therefore the nozzle groups can be moved smoothly.

In this liquid ejection method, the controller outputs predetermined data following the liquid ejection data string.

With this liquid ejection method, predetermined data is outputted after the final liquid ejection data string has been taken in, and therefore the predetermined data can be taken into the second shift register synchronized with the first clock signal. Accordingly, the predetermined data can be outputted to the first shift register even if the second clock signal is inadvertently generated. That is, the elements can be driven according to the predetermined data without uncertain data being taken into the second shift register. At this time, consumables such as the liquid can be kept from being wasted by setting predetermined data such that any effect is reduced when the elements are driven according to the predetermined data.

In this liquid ejection method, the liquid is ink.

With this liquid ejection method, excellent images can be printed by appropriately ejecting ink based on the appropriate liquid ejection data that is taken into the first shift register, Furthermore, a liquid ejection method comprises,
  outputting from a controller a liquid ejection data string and a first clock signal,
    the liquid ejection data string having liquid ejection data for ejecting a liquid from a nozzle,
    the liquid ejection data being associated with each of at least two nozzle groups having a plurality of the nozzles each provided with an element for ejecting the liquid, being of a number equivalent to a number of the nozzles of the nozzle groups, and being arranged in a predetermined order, and
    the liquid ejection data string having, in between each of the liquid ejection data associated with a predetermined nozzle group, one each of the liquid ejection data associated with another nozzle group arranged in a prearranged order;

taking in a predetermined number of the liquid ejection data successively from the liquid ejection data string to a second shift register in synchronization with the first clock signal;

latching in a latching circuit the liquid ejection data of a number equivalent to the number of the nozzle groups, including the liquid ejection data taken in to the second shift register, in synchronization with the first clock signal outputted after the predetermined number of the liquid ejection data has been taken in to the second shift register;

after the liquid ejection data has been latched in the latching circuit, taking in the liquid ejection data that is latched in the latching circuit, by the number of the nozzles of the nozzle groups, to a first shift register corresponding to the respective nozzle groups for holding the liquid ejection data together in the predetermined order, in synchronization with a second clock signal generated based on the first clock signal;

stopping output of the first clock signal after the final liquid ejection data of the liquid ejection data string is taken in to the first shift register and before the second clock signal is generated;

driving the element based on the liquid ejection data that has been taken in to the first shift register, wherein the liquid ejection data string outputted from the controller is taken in to the first shift register which is arranged movably relative to the controller via a cable, the controller outputs predetermined data following the liquid ejection data string, and the liquid is ink.

With such a liquid ejection method, it is possible to attain all of the effects mentioned above, and thus the object of the present invention is most effectively achieved.

Furthermore, a liquid ejection apparatus comprises:

(a) at least two nozzle groups having a plurality of nozzles each provided with an element for ejecting a liquid, (b) a drive section having a first shift register for holding liquid ejection data for ejecting the liquid from the nozzles, the liquid ejection data being of a number equivalent to a number of the nozzles of the nozzle groups and being held together in a predetermined order, and the drive section being provided for each of the nozzle groups for driving the element based on the liquid ejection data taken in to the first shift register, (c) a data processing section, including:

a second shift register for successively taking in a predetermined number of the liquid ejection data from the liquid ejection data string in synchronization with a first clock signal, the liquid ejection data string having the liquid ejection data, the liquid ejection data being associated with each of the nozzle groups, being of a number equivalent to a number of the nozzles of the nozzle groups, and being arranged in a predetermined order, and the liquid ejection data string having, in between each of the liquid ejection data associated with a predetermined nozzle group, one each of the liquid ejection data associated with another nozzle group arranged in a prearranged order; and a latching circuit for latching the liquid ejection data of a number equivalent to the number of the nozzle groups, including the liquid ejection data taken in to the second shift register, in synchronization with the first clock signal outputted after the predetermined number of the liquid ejection data has been taken in to the second shift register, wherein, after the liquid ejection data has been latched in the latching circuit, the data processing section takes in to the first shift registers respectively corresponding to each of the nozzle groups the liquid ejection data that is latched in the latching circuit, in synchronization with a second clock signal generated based on the first clock signal, and (d) a controller that outputs the liquid ejection data string and the first clock signal to the data processing section, and stops output of the first clock signal after the final liquid ejection data of the liquid ejection data string is taken in to the first shift register and before the second clock signal is generated.

With this liquid ejection apparatus, the final liquid ejection data in the liquid ejection data string is taken into the first shift register until the final items and since data after this is not taken in, it is possible to take into the first shift register only the appropriate liquid ejection data. Then, liquid can be ejected appropriately based on the appropriate liquid ejection data that is taken into the first shift register.

Furthermore, a computer-readable medium for enabling operation of a controller that controls a liquid ejection apparatus comprises the following codes:

a code for outputting from a controller a liquid ejection data string and a first clock signal, the liquid ejection data string having liquid ejection data for ejecting a liquid from a nozzle, the liquid ejection data being associated with each of at least two nozzle groups having a plurality of the nozzles each provided with an element for ejecting the liquid, being of a number equivalent to a number of the nozzles of the nozzle groups, and being arranged in a predetermined order, and the liquid ejection data string having, in between each of the liquid ejection data associated with a predetermined nozzle group, one each of the liquid ejection data associated with another nozzle group arranged in a prearranged order;

a code for taking in a predetermined number of the liquid ejection data successively from the liquid ejection data string to a second shift register in synchronization with the first clock signal;

a code for latching in a latching circuit the liquid ejection data of a number equivalent to the number of the nozzle groups, including the liquid ejection data taken in to the second shift register, in synchronization with the first clock signal outputted after the predetermined number of the liquid ejection data has been taken in to the second shift register;

a code for, after the liquid ejection data has been latched in the latching circuit, taking in the liquid ejection data that is latched in the latching circuit, by the number of the nozzles of the nozzle groups, to a first shift register corresponding to the respective nozzle groups for holding the liquid ejection data together in the predetermined order, in synchronization with a second clock signal generated based on the first clock signal;

a code for stopping output of the first clock signal after the final liquid ejection data of the liquid ejection data string is taken in to the first shift register and before the second clock signal is generated; and a code for driving the element based on the liquid ejection data that has been taken in to the first shift register.

With this computer-readable medium, the final liquid ejection data in the liquid ejection data string is taken into the first shift register until the final items and since data after this is not taken in, it is possible to take into the first shift register only the appropriate liquid ejection data. Then, liquid can be ejected appropriately based on the appropriate liquid ejection data that is taken into the first shift register.

Furthermore, a liquid ejection system having (A) a computer main unit and (B) a liquid ejection apparatus that is connected to the computer main unit and comprises the following:

(a) at least two nozzle groups having a plurality of nozzles each provided with an element for ejecting a liquid, (b) a drive section having a first shift register for holding liquid ejection data for ejecting the liquid from the nozzles, the liquid ejection data being of a number equivalent to a number of the nozzles of the nozzle groups and held together in a predetermined order, and the drive section being provided for each of the nozzle groups for driving the element based on the liquid ejection data taken in to the first shift register, (c) a data processing section, including:

a second shift register for successively taking in a predetermined number of the liquid ejection data from the liquid ejection data string in synchronization with a first clock signal, the liquid ejection data string having the liquid ejection data, the liquid ejection data being associated with each of the nozzle groups, being of a number equivalent to a number of the nozzles of the nozzle groups, and being arranged in a predetermined order, and the liquid ejection data string having, in between each of the liquid ejection data associated with a predetermined nozzle group, one each of the liquid ejection data associated with another nozzle group arranged in a prearranged order, and a latching circuit for latching the liquid ejection data of a number equivalent to the number of the nozzle groups, including the liquid ejection data taken in to the second shift register, in synchronization with the first clock signal outputted after the predetermined number of the liquid ejection data has been taken in to the second shift register, wherein, after the liquid ejection data has been latched in the latching circuit, the data processing section takes in to the first shift registers respectively corresponding to each of the nozzle groups the liquid ejection data that is latched in the latching circuit, in synchronization with a second clock signal generated based on the first clock signal, and (d) a controller that outputs the liquid ejection data string and the first clock signal to the data processing section, and stops output of the first clock signal after the final liquid ejection data of the liquid ejection data string is taken in to the first shift register and before the second clock signal is generated.

With this liquid ejection system, the final liquid ejection data in the liquid ejection data string is taken into the first shift register until the final items and since data after this is not taken in, it is possible to take into the first shift register only the appropriate liquid ejection data. Then, liquid can be ejected appropriately based on the appropriate liquid ejection data that is taken into the first shift register.

Configuration of the Liquid Ejection System

The present embodiment is described using a printing system having a printer (printing apparatus) as a liquid ejection apparatus that uses ink as a liquid as an example of a liquid ejection system.

<Regarding the Overall Configuration of the Printing System>

FIG. 1 is a diagram for describing a configuration of a printing system 100. This illustrative printing system 100 shown here includes a printer 1 as a liquid ejection apparatus and a computer 110 as a print control apparatus. Specifically, the printing system 100 includes a printer 1, the computer 110, a display device 120, an input device 130, and a recording and reproducing device 140.

The printer 1 prints images on media such as paper, cloth, and film. The computer 110 is communicably connected to the printer 1. The computer 110 outputs print data corresponding to an image to the printer 1 in order to print the image with the printer 1. Computer programs such as an application program and a printer driver have been installed on the computer 110. The display device 120 has a display. The display device 120 is a device for displaying, for example, a user interface of the computer programs. The input device 130 is, for example, a keyboard 131 and a mouse 132. The recording and reproducing device 140 is, for example, a flexible disk drive device 141 or a CD-ROM drive device 142.

The Computer

<Configuration of the Computer 110>

Figure 2:
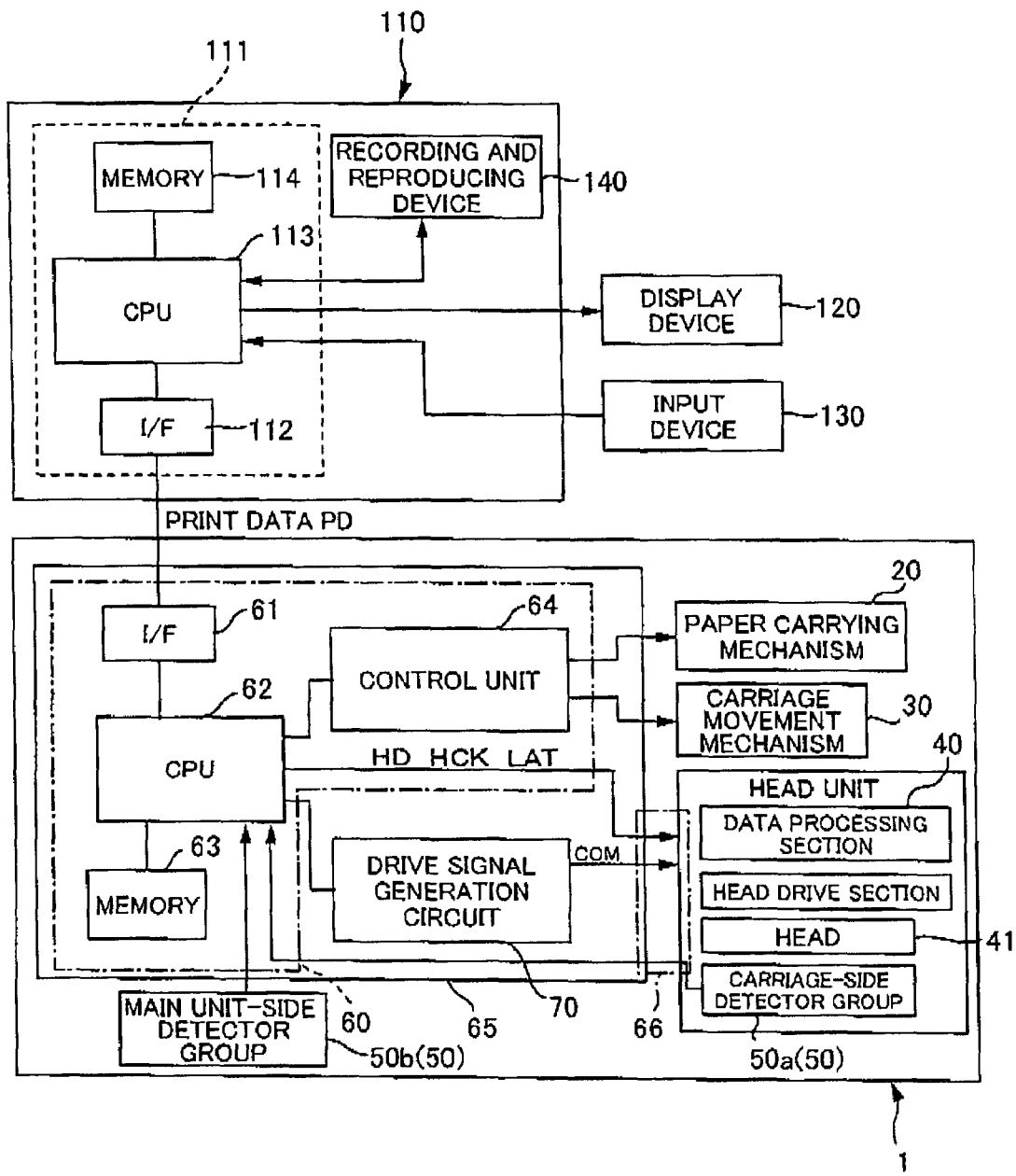
FIG. 2 is a block diagram for describing a configuration of a computer and a printer.

FIG. 2 is a block diagram that describes the configuration of the computer 110 and the printer 1. First, the configuration of the computer 110 is described in brief. The computer 110 has the recording and reproducing device 140 described above and a host-side controller 111. The recording and reproducing device 140 is communicably connected to the host-side controller 111, and for example is attached to the housing of the computer 110. The host-side controller 111 performs various controls in the computer 110, and is also communicably connected to the display device 120 and the input device 130 mentioned above. The host-side controller 111 has an interface section 112, a CPU 113, and a memory 114. The interface section 112 is interposed between the computer 110 and the printer 1, and sends and receives data between the two. The CPU 113 is a computation processing device for performing the overall control of the computer 110. The memory 114 is for securing, for example, a region for storing computer programs used by the CPU 113 and a working region, and is constituted by a RAM, EEPROM, ROM, or magnetic disk device, for example. Examples of computer programs that are stored on the memory 114 include the application program and printer driver mentioned above. The CPU 113 performs various controls in accordance with the computer programs stored on the memory 114.

The printer driver causes the computer 110 to convert image data to print data and sends the print data to the printer 1. The print data is data in a form that can be interpreted by the printer 1, and includes various command data and pixel data Pix (see FIG. 7) as liquid ejection data. Command data is data for ordering the printer 1 to execute a specific operation. Among the command data is, for example, command data that orders the supply of paper, command data that indicates a carry amount, and command data that orders the discharge of paper. Moreover, the pixel data Pix is data about pixels of the image to be printed, and corresponds to each of the pixels.

Here, "pixels" refers to unit regions that constitute the image, for example, a region indicated by one cell in a grid defined virtually on a paper S. Images are made by forming dots in these pixels. The pixel data of the print data is data relating to the dots that are formed on the paper S, for example, data indicating whether or not a dot is to be formed in a target pixel. In the present embodiment, in order to facilitate description of the invention, the pixel data Pix of the print data is constituted by 1-bit data. That is, the pixel data Pix is a data value [0] corresponding to no dot or a data value [1] corresponding to a dot. Here the printer expresses gradations by a technique such as dithering. It should be noted that the pixel data of the image data before conversion to print data is 256-gradation RGB data or CMYK data. Although the pixel data Pix is 1-bit data in the present embodiment, it is also possible to use two bits such as, for example, a data value [00] corresponding to no dot, a data value [01] corresponding to a small dot, a data value [10] corresponding to the formation of a medium dot, and a data value [11] corresponding to a large dot, or a number of bits greater than this. In this case, the pixel data indicates gradation values to be expressed by dots to be formed in target pixels.

The Printer

<Regarding the Configuration of the Printer 1>

Figure 3A:
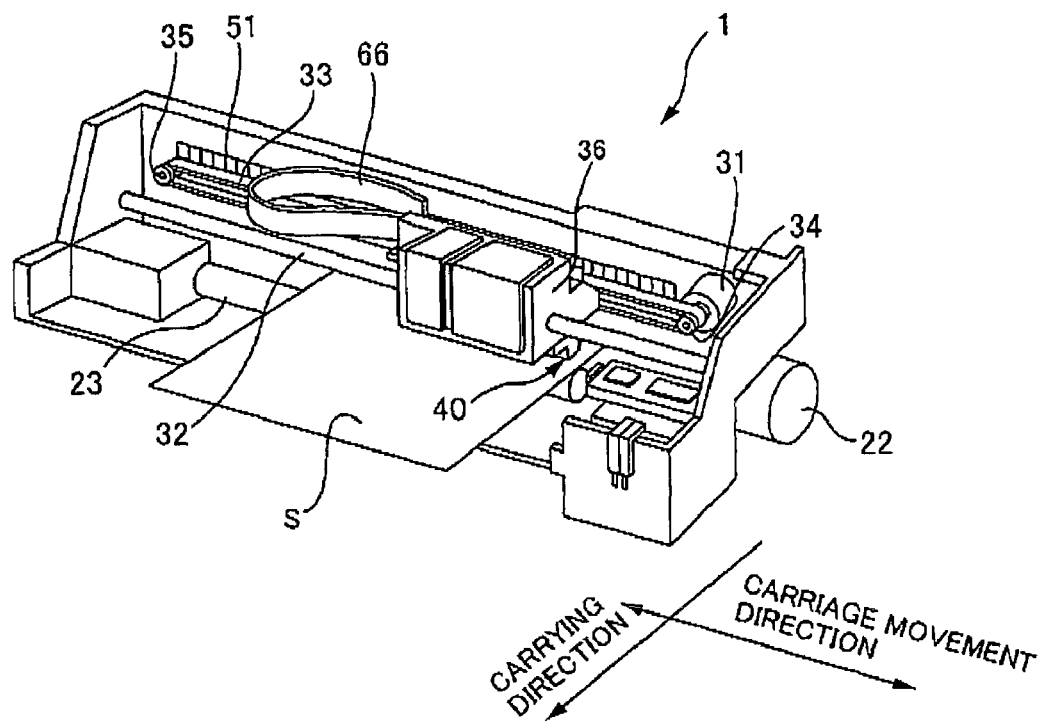
FIG. 3A is a diagram that shows the configuration of the printer of this embodiment.
Figure 3B:
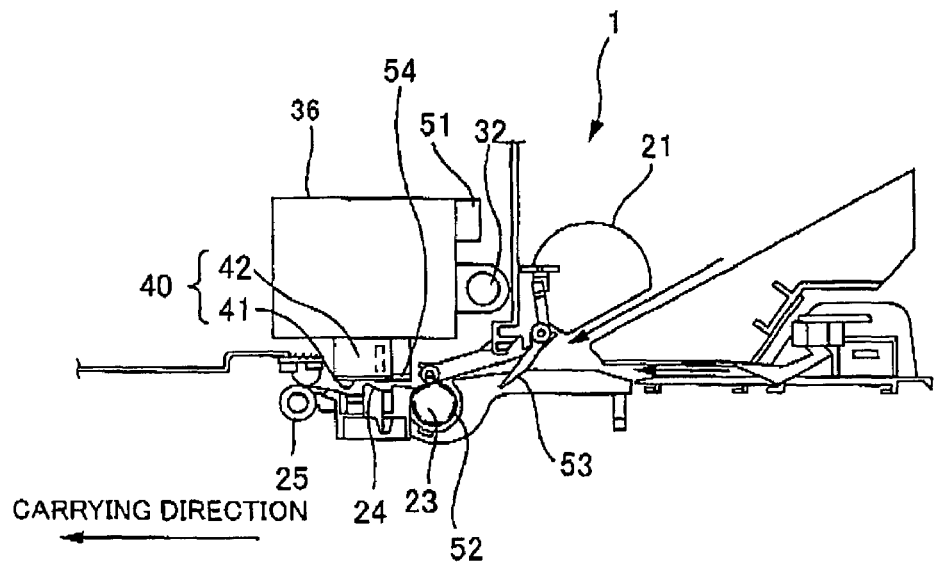
FIG. 3B is a lateral view illustrating the configuration of the printer of this embodiment.

FIG. 3A is a diagram that shows a configuration of the printer 1 of this embodiment. FIG. 3B is a lateral view illustrating the configuration of the printer 1 of this embodiment. It should be noted that FIG. 2 also is referred to in the following description.

The printer 1 is provided with a paper carrying mechanism 20 for carrying a medium such as paper, a carriage movement mechanism 30 for moving a carriage 36 having nozzles n, a head unit 40 mounted on the carriage 36, detector groups 50 for detecting the condition of the printer, a printer-side controller 60 for controlling the printer, and a drive signal generation circuit 70. It should be noted that in this embodiment the printer-side controller 60 and the drive signal generation circuit 70 are provided in a common controller substrate 65. Furthermore, the head unit 40 has a data processing section 44, a head drive section 45 as a drive section, and a print head 41. Since the carriage 36 is provided such that it can move relative to the printer main unit in which the controller substrate 65 is provided, the controller substrate 65 and the head nit 40 are connected by a flat flexible cable (hereinafter referred to as "FFC") 66.

In the printer 1, the printer-side controller 60 controls the control targets, that is, the paper carrying mechanism 20, the carriage movement mechanism 30, the head unit 40 (the data processing section 44, the head drive section 45, and the head 41), and the drive signal generation circuit 70. Thus, the printer-side controller 60 causes an image to be printed on the paper S based on print data PD obtained from the computer 110. The detectors of the detector groups 50 monitor conditions within the printer 1, The detectors output the result of this detection to the printer-side controller 60. The printer-side controller 60 receives the detection results from the detectors and controls the various control targets based on those detection results.

<Regarding the Paper Carrying Mechanism 20>

The paper carrying mechanism 20 sends the paper S to a printable position, as well as carries the paper S by a predetermined carry amount in the carrying direction. The carrying direction is a direction that intersects the carriage movement direction. The paper carrying mechanism 20 has a paper supply roller 21, a carry motor 22, a carry roller 23, a platen 24, and a discharge roller 25. The paper supply roller 21 is a roller for delivering the paper S that has been inserted into a paper insertion opening into the printer 1, and in this example has a cross-sectional shape that resembles the letter D. The carry motor 22 is a motor for carrying the paper S in the carrying direction, and its operation is controlled by the printer-side controller 60. The carry roller 23 is a roller for carrying the paper S that has been delivered by the paper feed roller 21 up to a printable region. The operation of the carry roller 23 also is controlled by the carry motor 22. The platen 24 is a member that supports the paper S that is subjected to printing from the rear side of the paper S. The discharge roller 25 is a roller for carrying the paper S for which printing has ended.

<Regarding the Carriage Movement Mechanism 30>

The carriage movement mechanism 30 is for moving the carriage 36 to which the head unit 40 is attached in the carriage movement direction. The carriage movement direction includes the direction of movement from one side to the other side and the direction of movement from that other side to the one side. It should be noted that because the head unit 40 includes the print head 41, the carriage movement direction corresponds to the movement direction of the print head 41, and the carriage movement mechanism 30 corresponds to a head movement section that moves the print head 41 in the movement direction. The carriage movement mechanism 30 has a carriage motor 31, a guide shaft 32, a timing belt 33, a drive pulley 34, and a driven pulley 35. The carriage motor 31 corresponds to the drive source for moving the carriage 36. The operation of the carriage motor 31 is controlled by the printer-side controller 60. The drive pulley 34 is attached to the rotation axis of the carriage motor 31. The drive pulley 34 is disposed on one end side in the carriage movement direction. The driven pulley 35 is disposed at the other end side in the carriage movement direction on the side opposite the drive pulley 34. The timing belt 33 is connected to the carriage 36 and is extended between the drive pulley 34 and the driven pulley 35, The guide shaft 32 supports the carriage 36 in a manner that permits movement thereof. The guide shaft 32 is attached in the carriage movement direction. Thus, operation of the carriage motor 31 causes the carriage 36 to move in the carriage movement direction along the guide shaft 32.

<Regarding the Head Unit 40>

Figure 4:
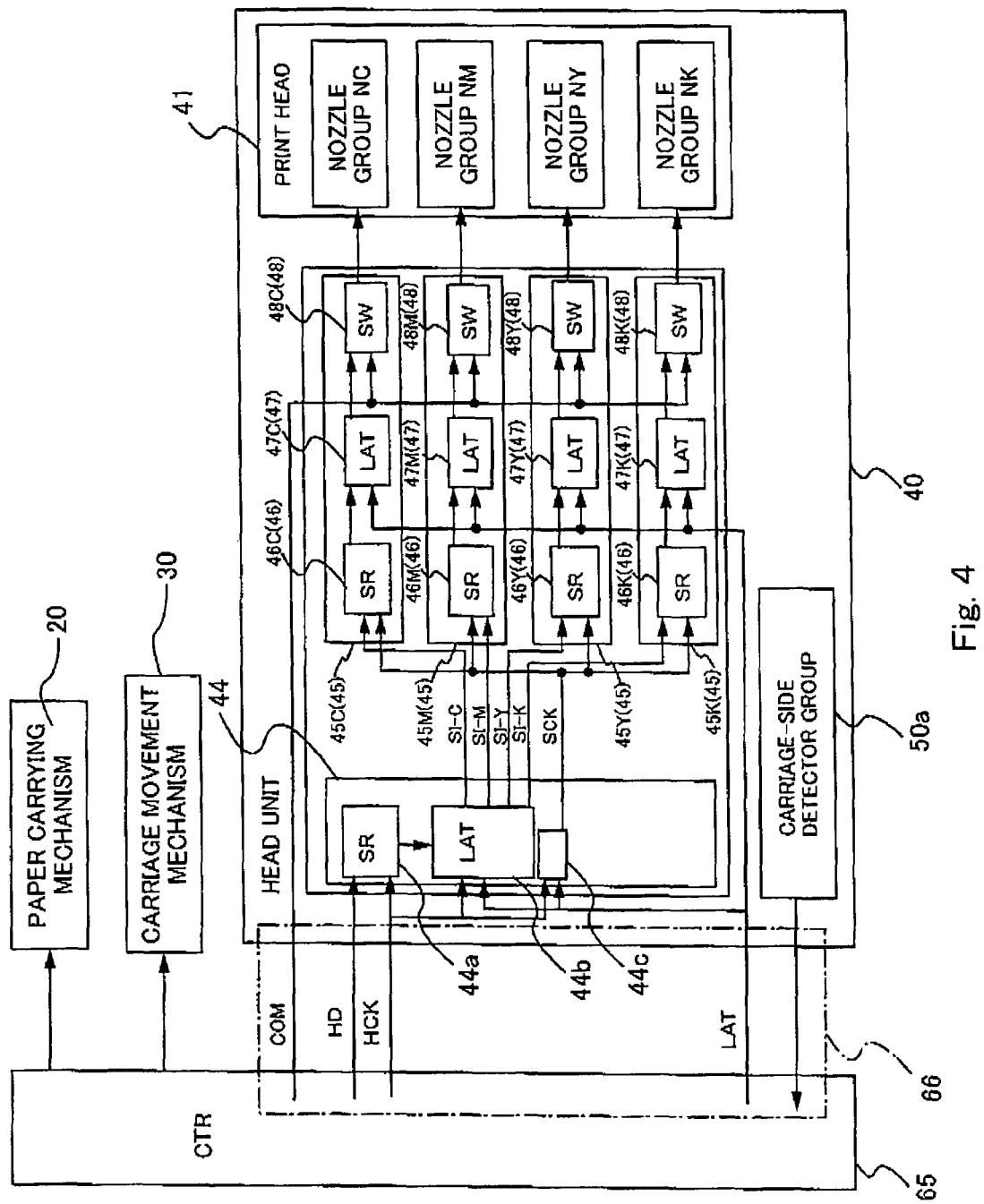
FIG. 4 is a diagram for describing the configuration of the head unit.

FIG. 4 is a diagram for describing the structure of the head unit.

The head unit 40 is for ejecting ink as a liquid toward the paper S. The head unit 40 is attached to the carriage 36. The print head 41 included in the head unit 40 is provided on a bottom surface of a head casing 42. The data processing section 44 and the head drive section 45 included in the head unit 40 are provided inside the head casing 42.

Figure 5:
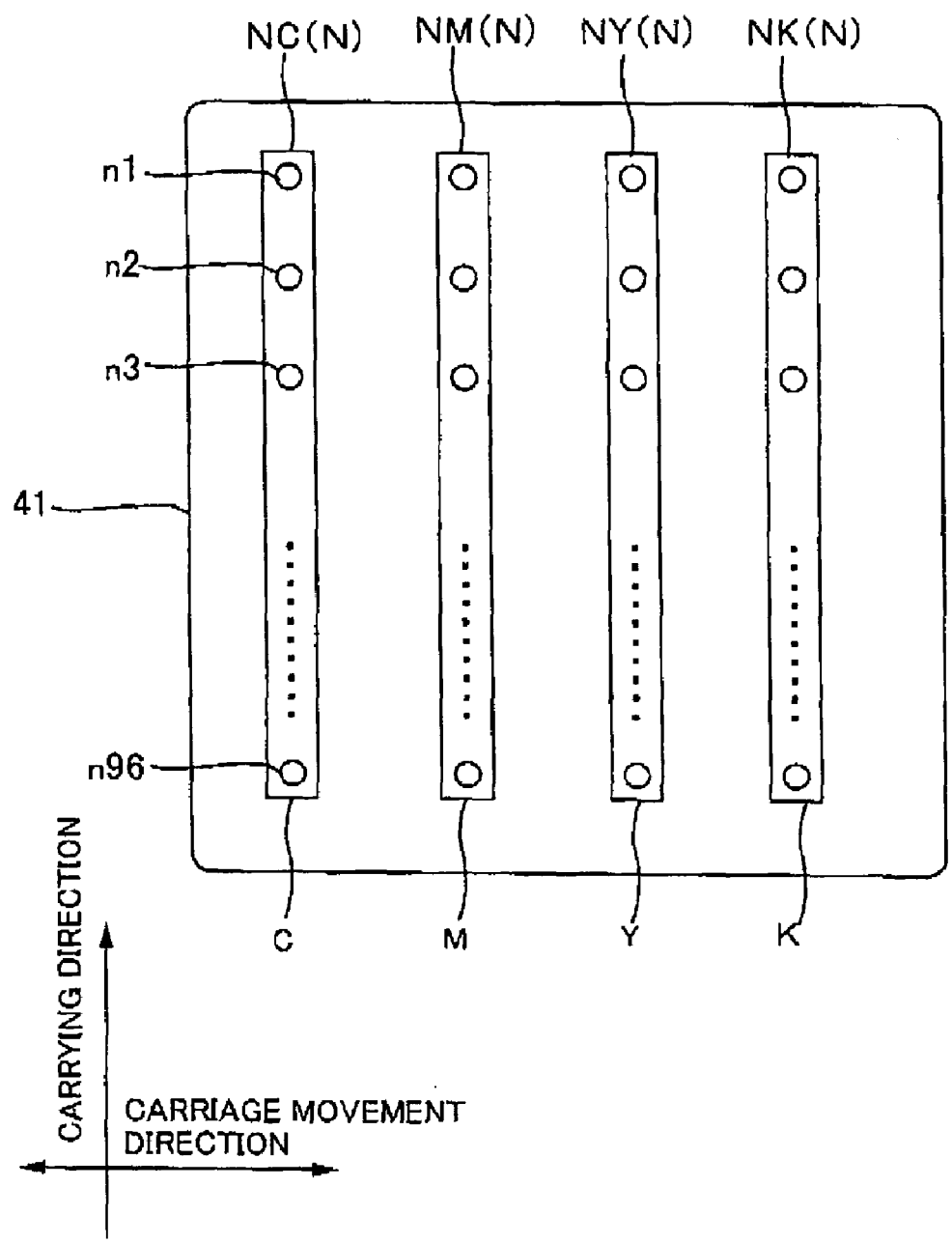
FIG. 5 is a diagram showing a configuration and arrangement of nozzles provided on a bottom surface of the print head 41.

FIG. 5 shows a configuration and arrangement of nozzles provided on a bottom surface of the print head 41. As shown in this diagram, a plurality of nozzles n for ejecting inks of the colors yellow (Y), magenta (M), cyan (C), and black (K) are provided on the bottom surface of the print head 41. These nozzles n are lined up in a single row for each color and arranged along the carrying direction of the paper. In the present embodiment, each of the color nozzle groups N is constituted by 96 nozzles n1 to n96, namely, a cyan nozzle group NC, a magenta nozzle group NM, a yellow nozzle group NY, and a black nozzle group NK. Furthermore, each of the nozzles n is provided with a piezo element 417 (see FIG. 6) as an element for ejecting ink.

When a voltage of a predetermined duration is applied between electrodes provided at both ends of the piezo element 417, the piezo elements expand for the duration of voltage application and deform a lateral wall of the ink channel. Accordingly, the volume of the ink channel is constricted according to the elongation of the piezo element 417, and ink corresponding to this amount of constriction becomes an ink droplet which is ejected from the corresponding nozzle n1 to n96 of the color nozzle groups NC, NM, NY, and NK. The piezo element 417 is driven by a drive signal COM that is outputted from the drive signal generation circuit 70. The drive signals COM in this embodiment are used in common for all of the piezo elements 417 corresponding to a single nozzle row.

Figure 6:
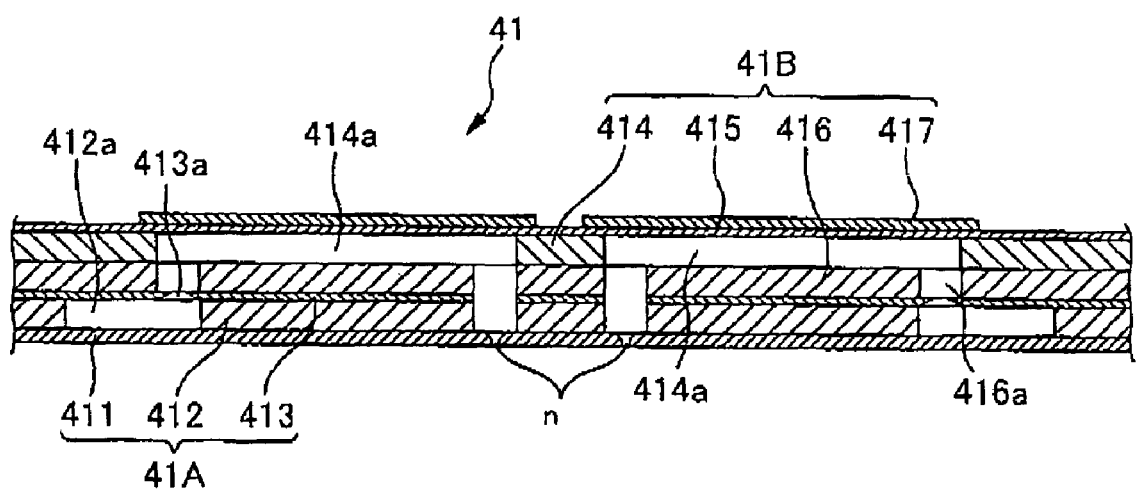
FIG. 6 is a cross-sectional view for describing the structure of the head.

FIG. 6 is a cross-sectional view for describing a structure of the print head 41. The illustrative print head 41 shown here has a channel unit 41A and an actuator unit 41B. The channel unit 41A has a nozzle plate 411 in which nozzles n are provided, a storage chamber formation substrate 412 in which open portions that become ink storage chambers 412a are formed, and a supply opening formation substrate 413 in which ink supply openings 413a are formed. The actuator unit 41B has a pressure chamber formation substrate 414 in which open portions that become pressure chambers 414a are formed, a vibration plate 415 that partitions some of the pressure chambers 414a, a lid member 416 in which open portions that become supply-side communication openings 416a are formed, and piezo elements 417 formed on the surface of the vibration plate 415. A series of channels leading from the ink storage chambers 412a to the nozzles n through the pressure chambers 414a are formed in the print head 41. At the time of use, the channels become filled with ink, and by altering the shape of the piezo elements 417, ink can be ejected from the corresponding nozzles n.

The data processing section 44 is provided with a second shift register 44a capable of taking in a number of items of data (here three items) that is one less than the number of nozzle groups; a latching circuit 44b having elements which are equal in number to the number of nozzles groups for latching data [(number of nozzles −1) bits] taken into the second shift register 44a and data (1 bit) of a pixel data string HD as a liquid ejection data string; and a clock conversion section 44c for converting a data take-in clock (first clock signal) HCK which is outputted from the printer-side controller 60, to an output clock (second clock signal) SCK that is used for timing output to the head drive sections 45.

The head drive section 45 is arranged for each of the nozzle groups N, and each head drive section 45 is provided with a first shift register 46, a drive section latching circuit 47, and a switch 48.

The first shift register 46 is capable of taking in items of data equal to the number of nozzles (here 96) provided in the nozzle groups N. The drive section latching circuit 47 is capable of latching the data that is taken into the first shift register 46.

The switch 48 is turned on/off in response to the pixel data Pix that is latched in the drive section latching circuit 47. A voltage of the drive signal COM is applied to a target piezo element 417 by the turning on of the switch 48.

Transfer and conversion processing of the data inside the printer 1 is described in detail later.

<Regarding the Detector Groups 50>

The detector groups 50 are for monitoring the conditions within the printer 1. The detector groups 50 include a carriage-side detector group 50a such as a linear encoder 51 and an optical sensor 54 mounted in the carriage 36 and a main unit-side detector group 50b such as a rotary encoder 52 and a paper detector 53. The linear encoder 51 is for detecting the position of the carriage 36 (the print head 41 and the nozzle groups N) in the carriage movement direction. The rotary encoder 52 is for detecting the amount of rotation of the carry roller 23. The paper detector 53 is for detecting the position of the leading edge of the paper S to be printed. The optical sensor 54 is provided on the carriage 36 and is capable of detecting whether or not a paper S is present in the opposing position, and for example can detect the width of the paper S by detecting the edges of the paper S while moving.

<Regarding the Printer-Side Controller 60>

The printer-side controller 60 performs control of the printer 1. The printer-side controller 60 has an interface section 61, a CPU 62, a memory 63, and a control unit 64. The interface section 61 sends and receives data to and from the computer 110 which is an external device, The CPU 62 is a computing processing device for carrying out overall control of the printer 1. The memory 63 is for securing, for example, a region for storing the programs of the CPU 62 and a working region, and is constituted by a memory device such as a RAM, EEPROM, or ROM. The CPU 62 controls various control targets in accordance with computer programs stored on the memory 63. For example, the CPU 62 controls the paper carrying mechanism 20 and the carriage movement mechanism 30 via the control unit 64.

The CPU 62 also outputs head control signals for driving the head 41 to the data processing section and the head drive section 45, and outputs control signals for causing the generation of drive signals COM to the drive signal generation circuit 70. The head control signals include the data take-in clock HCK, pixel data string HD, and a latch signal LAT, for example. Further, the control signal for causing generation of the drive signal COM is a DAC value for example, and is information for indicating a voltage of the drive signal outputted from the drive signal generation circuit 70 and is updated at a very short update cycle.

<Regarding Transfer and Conversion Processing of Data>

The print data PD that is outputted from the computer 110 to the printer 1 is serial data in which for example a plurality of pixel data Pix for forming an image on printing paper or the like is arranged in an order that is printable by the printer 1. This serial data is associated with the nozzle groups N by the printer-side controller 60 and pixel data for the number of nozzles (here 96 nozzles) that each of the nozzle groups N possesses is arranged in the order in which the nozzles are arranged. The amount of these pixel data Pix is the number of bits required for a one-time ejection cycle, that is, the number of bits is the number of nozzles × the number of nozzle groups. To transfer these pixel data as the pixel data string HD, which is a single signal line, the leading item of data of each nozzle group is sent in the order of, for example, the nozzle group NC, the nozzle group NK, the nozzle group NM, and the nozzle group NY, and then the second item of data of each nozzle group is sent in the order of the nozzle group NC, the nozzle group NK, the nozzle group NM, and the nozzle group NY. This procedure is repeated as many times as there are nozzles. Accordingly, the pixel data Pix that is associated with the nozzle groups N and corresponds to the number of nozzles possessed by the nozzle groups N is arranged in the order in which the nozzles are arranged as a predetermined order and between the pixel data Pix that is associated with a predetermined nozzle group, for example the cyan nozzle group NC, one each of the pixel data Pix associated with the magenta nozzle group NM, the yellow nozzle group NY, and the black nozzle group NK are arranged in a prearranged order and constitute a pixel data string HD as a liquid ejection data string.

Figure 7:
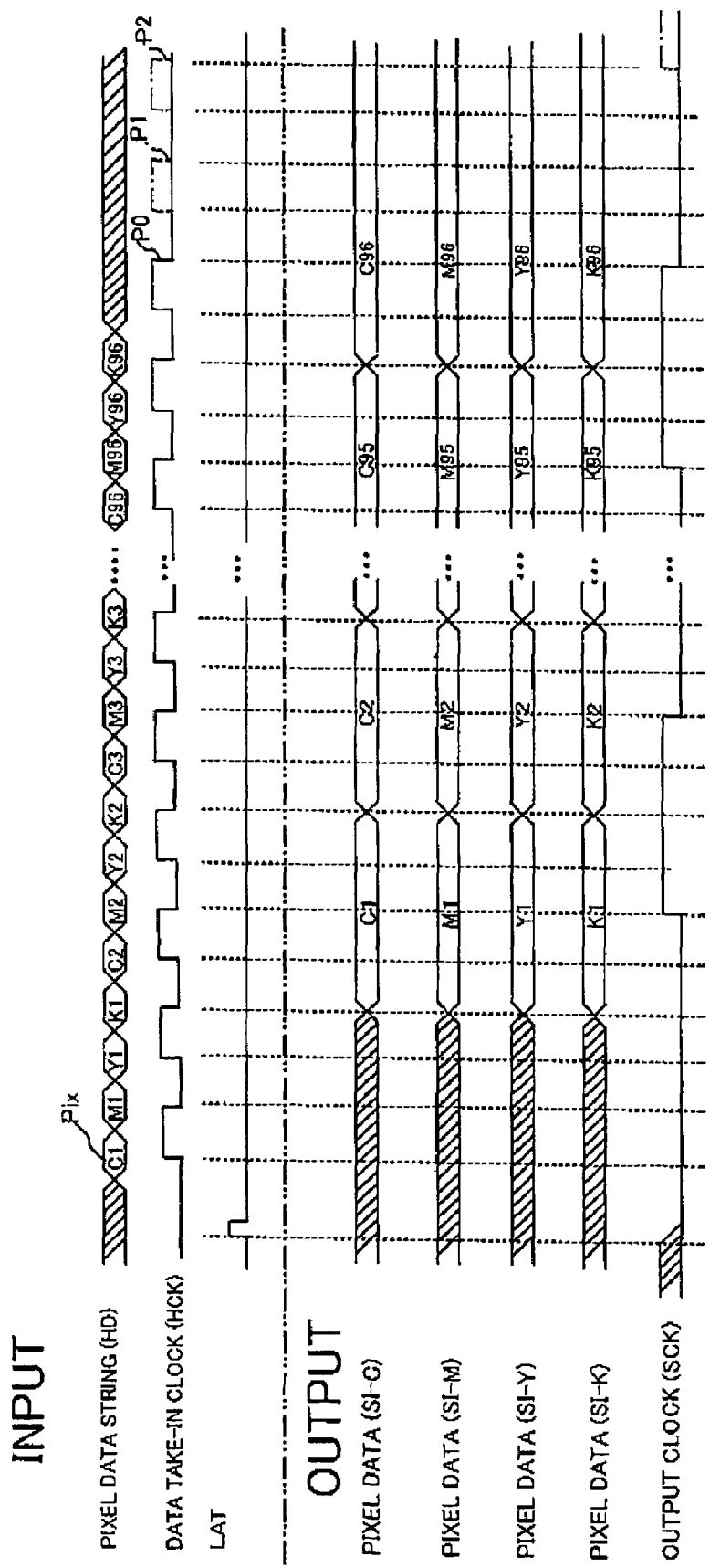
FIG. 7 is a diagram for describing a process in which the pixel data string HD that has been transferred is converted to data for each nozzle row.

FIG. 7 is a diagram for describing a process in which the pixel data string HD that has been transferred is converted to data for each nozzle row. In the following description, individual items of the pixel data Pix are indicated as follows. Namely, the pixel data corresponding to the cyan nozzle group is referred to as C1 to C96, the pixel data corresponding to the magenta nozzle group is referred to as M1 to M96, the pixel data corresponding to the yellow nozzle group is referred to as Y1 to Y96, and the pixel data corresponding to the black nozzle group is referred to as K1 to K96. As shown in the diagram, the pixel data string HD has 96 items of pixel data Pix each, corresponding to each of the nozzle groups and is data arranged in the order, for example, C1, M1, Y1, K1, C2, M2, Y2, K2, . . . , C96, M96, Y96, K96. That is to say, in this example, between each of the 96 items of pixel data associated with the cyan nozzle group NC there is one item each of pixel data associated with the magenta nozzle group NM, the yellow nozzle group NY, and the black nozzle group NK arranged in the order of magenta, yellow, black.

Figure 8:
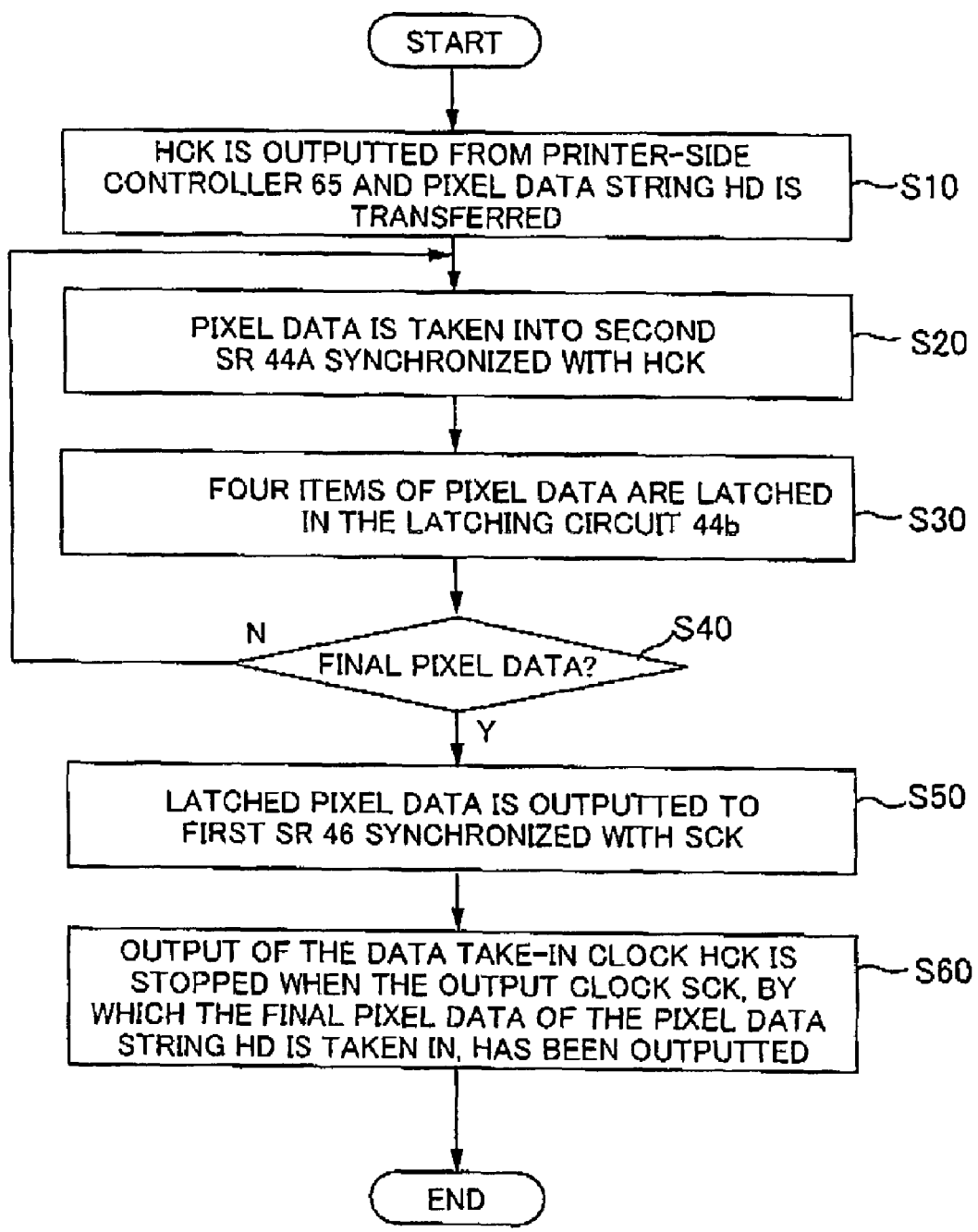
FIG. 8 is a flowchart for describing a flow of data.

FIG. 8 is a flowchart for describing a flow of data.

Since the pixel data string HD generated by the printer-side controller 60 is serial multiplexed data, it is transferred to the data processing section 44 of the head unit 40 using a single core wire of the FFC 66 that connects the controller substrate 65 and the head unit 40 (S10). At this time, the data take-in clock HCK is also outputted from the printer-side controller 60 to the data processing section 44, and this indicates the timing by which pixel data is taken in at the second shift register 44a of the data processing section 44. It should be noted that a LAT pulse is generated before commencing a new transfer, and the data that has already been transferred to the SR 46 is latched in the LAT 47 and the data processing section 44 is initialized.

Then, the second shift register 44a of the data processing section 44 takes in three consecutive items of pixel data Pix from the leading item of pixel data C1 of the pixel data string HD that is outputted from the printer-side controller 60 synchronized with the rising edge and the falling edge of the data take-in clock HCK (S20). That is, three items of pixel data are taken in at the rising and falling edges of a single pulse of the data take-in clock HCK and the rising edge of the next pulse. The items of pixel data Pix taken into the second shift register 44a at this time are the first items of pixel data C1, M1, and Y1 respectively associated with the cyan nozzle group NC, the magenta nozzle group NM, and the yellow nozzle group NY.

The three items of pixel data C1, M1, and Y1 that have been taken into the second shift register 44a are latched in the latching circuit 44b with the timing by which the fourth item of pixel data K1 is taken in synchronized with the data take-in clock HCK (S30). That is, the fourth item of pixel data K1 is latched without passing through the second shift register 44a.

The four items of pixel data C1, M1, Y1, and K1 that are latched are held in the latching circuit 44b until the timing of the next latching in the latching circuit 44b, that is, until edges of the take-in clock HCK for the number of nozzle groups are outputted.

At this time, the printer-side controller 60 discerns whether or not the pixel data that has been taken into the second shift register 44a is the final data (S40). Then, when the pixel data Pix taken into the second shift register 44a is discerned as not being the final data, then the pixel data Pix of the pixel data string HD is successively taken into the second shift register 44a synchronized respectively with the rising edge and the falling edge of the data take-in clock HCK (S20 to S40).

On the other hand, after the first four items of the pixel data C1, M1, Y1, and K1 have been latched in the latching circuit 44b, and when the next four items of the pixel data C2, M2, Y2, and K2 are to be taken in, the pixel data C1, M1, Y1, and K1 are taken in to the first shift register 46 of the head drive section 45 with the timing by which the second item of pixel data M2 is taken in, specifically, at the first falling edge of the data take-in clock HCK (S50). That is, a rising edge of an output clock SCK is generated as a predetermined clock signal with the timing of the first falling edge of the data take-in clock HCK, and the pixel data C1, M1, Y1, and K1 that are being latched are taken into the first shift register 46 synchronized with this output clock SCK. At this time, each of the elements of the latching circuit 44b are associated with a different head drive section 45 and the four items of the pixel data C1, M1, Y1, and K1 that have been taken into the latching circuit 44b are taken into first shift registers 46C, 46M, 46Y, and 46K possessed by respectively associated head drive sections 45C, 45M, 45Y, and 45K.

The timing for taking in the pixel data Pix of the latching circuit 44b to the first shift register 46 is prescribed by the output clock SCK that is outputted at each first falling edge of the two pulses of the data take-in clock HCK outputted after the pixel data Pix is latched in the latching circuit 44b. The output clock SCK is generated in a clock conversion section 44c of the data processing section 44 based on the data take-in clock HCK. Here, the timing for taking in the pixel data Pix of the latching circuit 44b to the first shift register 46 is not necessarily limited to the first falling edge of the data take-in clock HCK, but since SI-C, M, Y, K which are the output of the latching circuit 44b are exchanged at the second falling edge of the data take-in clock HCK, the timing of the second falling edge is preferable for having the longest time interval from the timing of the pixel data switching and a high probability for obtaining stable data.

Furthermore, after the second three items of the pixel data C2, M2, and Y2 are taken into the second shift register 44a of the data processing section 44 (S20), the three items of the pixel data C2, M2, and Y2 that have been taken in and the K2 that has been outputted in the pixel data string HD are latched in the latching circuit 44b with the timing by which the fourth item of pixel data K2 is taken in synchronized with the data take-in clock HCK, that is, at the falling edge of the data take-in clock HCK outputted after the three items of pixel data are taken into the second shift register (S30). Then, the second four items of the pixel data C2, M2, Y2, and K2 that are latched in the latching circuit 44b are taken in (S50) to the first shift register 46 of the head drive section 45 with the timing by which the second item of pixel data M3 is taken in when the next four items of the pixel data C3, M3, Y3, and K3 are to be taken in, that is, synchronized to the output clock SCK as a predetermined clock signal.

In this manner, the serial data of the pixel data string HD is outputted from the printer-side controller 60 to the data processing section 44, taken into the second shift register 44a synchronized with the data take-in clock HCK, and latched in the latching circuit 44b with the timing by which the fourth item of the pixel data Kx (x is a variable) is taken in. Then, the four items of the pixel data Cx, Mx, Yx, and Kx that are latched are taken into the first shift register 46 of the head drive section 45 synchronized with the output clock SCK when the next four items of the pixel data Cx+1, Mx+1, Yx+1, and Kx+1 are taken in.

Then, three items of the pixel data C96, M96, and Y96 of the final four items of the pixel data C96, M96, Y96, and K96 in the pixel data string HD are taken into the second shift register 44a synchronized with the data take-in clock HCK (S20), and the four items of the pixel data C96, M96, Y96, and K96 are latched in the latching circuit 44b with the timing by which the fourth item of the pixel data K96 is taken in (S30). Then, after this data in the pixel data string HD is not needed, but the data take-in clock HCK continues to be outputted. The final four items of the pixel data C96, M96, Y96, and K96 are taken into the first shift register 46 of the head drive section 45, synchronized with the output clock SCK as a predetermined clock signal that changes with the timing of the falling edge of a first pulse P0 in the data take-in clock HCK outputted after being latched in the latching circuit 44b (S50) At this time, all the 96 items of the pixel data Pix of the pixel data string HD corresponding respectively to the nozzle groups have been taken into the first shift register 46.

When all the pixel data Pix of the pixel data string HD are taken into the first shift register 46 of the head drive section 45, the printer-side controller 60 stops output of the data take-in clock HCK when the output clock SCK which has become the timing by which the final pixel data C96, M96, Y96, and K96 of the pixel data string HD is taken into the first shift register 46 has been outputted (S60).

For this reason, in the present embodiment, after the final pixel data C96, M96, Y96, and K96 of the pixel data string HD is taken into the first shift register 46, that is, after the ninety-sixth output clock SCK has been output, output of the data take-in clock HCK is stopped. Here, the timing for stopping the output of the data take-in clock HCK is set to after the ninety-sixth output clock SCK has been outputted in order to ensure that the pulse P0 for generating the output clock for taking in the ninety-sixth items of pixel data C96, M96, Y96, and K96 to the first shift register 46 is outputted, and to return the level of the data take-in clock HCK to a LOW level to prepare for outputting the next data take-in clock HCK.

Then, the 96 items of the pixel data Pix respectively taken into the first shift registers 46C, 46M, 46Y, and 46K are latched all together in drive section-side latching circuits 47C, 47M, 47Y, and 47K synchronized with the latch signal LAT outputted from the printer-side controller 60. The 96 items of pixel data that are respectively latched in the drive section-side latching circuits 47C, 47M, 47Y, and 47K are associated with the nozzles n1 to n96 respectively, and switches 48C, 48M, 48Y, 48K are turned on/off in response to the latched pixel data such that ink is ejected appropriately by applying the drive signal COM outputted from the drive signal generation circuit 70 to the target piezo elements 417.

With the printing system 100 and the printer 1 and the like of the present embodiment, the data take-in clock HCK from the printer-side controller 60 continues to be outputted even after the final items of the pixel data C96, M96, Y96, and K96 in the pixel data string HD are latched in the latching circuit 44b, and after these final items of the pixel data C96, M96, Y96, and K96 are taken into the first shift register 46, output of the data take-in clock HCK is stopped before a pulse P1 of the next data take-in clock HCK is outputted. Thus, because the output clock SCK is not outputted as a predetermined clock signal after the final items of the pixel data C96, M96, Y96, and K96 in the pixel data string HD are taken into the first shift register 46, the data latched in the latching circuit 44b at this time is not taken into the first shift register 46. That is to say, even if any data is latched in the latching circuit 44b after the final items of the pixel data Pix in the pixel data string HD are taken into the first shift register 46, that latched data cannot betaken into the first shift register 46. Thus, the pixel data Pix of the pixel data string HD is taken into the first shift register 46 until the final items of data without excess or deficiency and data after this is not taken in, and therefore it is possible to take into the first shift register 46 only the appropriate pixel data Pix. Accordingly, ink is ejected appropriately and excellent images are printed based on the appropriate pixel data Pix that is taken into the first shift register 46.

The present embodiment was described using an example in which the output of the data take-in clock HCK is stopped when the output clock SCK, which becomes the timing by which the four items of pixel data latched in the latching circuit 44b are taken into the first shift register, is outputted, but the timing for stopping the output of the data take-in clock HCK is not limited to this. That is, the output clock SCK, which is the timing for taking in the four items of pixel data latched in the latching circuit 44b to the first shift register 46, is outputted synchronized with the first falling edge of the data take-in clock RCK outputted after the four items of pixel data to be taken into the first shift register 46 are latched, and therefore output of the data take-in clock HCK may be stopped using any timing as long as it is in the interval after the four items of latched pixel data are taken into the first shift register 46 and before the falling edge of the second pulse P2 is detected.

Furthermore, the printer-side controller 60 provided on the printer main unit side and the data processing section 44 mounted on the carriage 36 arranged movably relative to the printer main unit are connected by the FFC 66, but as described above the pixel data Pix is transferred as serial multiplexed data between the printer-side controller 60 and the data processing section 44 and is configured so as to be converted to serial data for each drive section at the data processing section 44 of the carriage 36 side. Accordingly, it is possible to output from the printer-side controller 60 the pixel data (SI-C, SI-M, SI-Y, and SI-K) to be outputted to the plurality of nozzle groups N respectively using a single core wire. Therefore, it is possible to reduce the width of the FFC 66 that connects the printer-side controller 60 and the data processing section 44 and the printer 1 can be made more compact. Also, because an FFC 66 with a small number of core wires can bend easily, it is possible to reduce the burden incurred when the carriage 36 moves, and therefore the carriage 36 can be moved smoothly.

The present embodiment was described having a nozzle group provided for each color of ink and the nozzle rows arranged in single rows. However, the nozzle groups are not limited to this and there may be a plurality of nozzle rows and it is possible to handle a plurality of nozzles associated with a single head drive section as a single nozzle group.

Other Embodiments

The foregoing embodiment primarily describes the printing system 100 that includes the printer 1, but it also includes the disclosure of a method of applying drive signals COM and a liquid ejection system, etc. The foregoing embodiment is for the purpose of elucidating the present invention, and is not to be interpreted as limiting the present invention. The invention can of course be altered and improved without departing from the gist thereof, and includes functional equivalents. In particular, the embodiments mentioned below are also included in the invention.

<Regarding the Ink>

The foregoing embodiment is an embodiment of the printer 1, and thus dye ink or pigment ink in liquid form was ejected from the nozzles n. However, as long as the ink that is ejected from the nozzles n is a liquid, then there is no limitation to such inks.

<Regarding Other Applications>

The printer 1 was described in the above embodiments, but the present invention is not limited to this. For example, the same technology as that of the present embodiment can also be adopted for various types of liquid ejection apparatuses that employ inkjet technology, including color filter manufacturing devices, dyeing devices, fine processing devices, semiconductor manufacturing devices, surface processing devices, three-dimensional shape forming machines, liquid vaporizing devices, organic EL manufacturing devices (particularly macromolecular EL manufacturing devices), display manufacturing devices, film formation devices, and DNA chip manufacturing devices. Also, these methods and manufacturing methods are within the scope of application.

What is claimed is:

1. A liquid ejection method, comprising:
   outputting from a controller a liquid ejection data string and a first clock signal,
      the liquid ejection data string having liquid ejection data for ejecting a liquid from a nozzle,
      the liquid ejection data being associated with each of at least two nozzle groups having a plurality of the nozzles each provided with an element for ejecting the liquid, being of a number equivalent to a number of the nozzles of the nozzle groups, and being arranged in a predetermined order, and
      the liquid ejection data string having, in between each of the liquid ejection data associated with a predetermined nozzle group, one each of the liquid ejection data associated with another nozzle group arranged in a prearranged order;
   taking in a predetermined number of the liquid ejection data successively from the liquid ejection data string to a second shift register in synchronization with the first clock signal;
   latching in a latching circuit the liquid ejection data of a number equivalent to the number of the nozzle groups, including the liquid ejection data taken in to the second shift register, in synchronization with the first clock signal outputted after the predetermined number of the liquid ejection data has been taken in to the second shift register;
   after the liquid ejection data has been latched in the latching circuit, taking in the liquid ejection data that is latched in the latching circuit, by the number of the nozzles of the nozzle groups, to a first shift register corresponding to the respective nozzle groups for holding the liquid ejection data together in the predetermined order, in synchronization with a second clock signal generated based on the first clock signal;
   stopping output of the first clock signal after the final liquid ejection data of the liquid ejection data string is taken in to the first shift register and before the second clock signal is generated; and
   driving the element based on the liquid ejection data that has been taken in to the first shift register.

2. A liquid ejection method according to claim 1, wherein the liquid ejection data string outputted from the controller is taken in to the first shift register which is arranged movably relative to the controller via a cable.

3. A liquid ejection method according to claim 1, wherein the controller outputs predetermined data following the liquid ejection data string.

4. A liquid ejection method according to claim 1, wherein the liquid is ink.

5. A liquid ejection method comprising:
   outputting from a controller a liquid ejection data string and a first clock signal,
      the liquid ejection data string having liquid ejection data for ejecting a liquid from a nozzle,
      the liquid ejection data being associated with each of at least two nozzle groups having a plurality of the nozzles each provided with an element for ejecting the liquid, being of a number equivalent to a number of the nozzles of the nozzle groups, and being arranged in a predetermined order, and
      the liquid ejection data string having, in between each of the liquid ejection data associated with a predetermined nozzle group, one each of the liquid ejection data associated with another nozzle group arranged in a prearranged order;
   taking in a predetermined number of the liquid ejection data successively from the liquid ejection data string to a second shift register in synchronization with the first clock signal;
   latching in a latching circuit the liquid ejection data of a number equivalent to the number of the nozzle groups, including the liquid ejection data taken in to the second shift register, in synchronization with the first clock signal outputted after the predetermined number of the liquid ejection data has been taken in to the second shift register;
   after the liquid ejection data has been latched in the latching circuit, taking in the liquid ejection data that is latched in the latching circuit, by the number of the nozzles of the nozzle groups, to a first shift register corresponding to the respective nozzle groups for holding the liquid ejection data together in the predetermined order, in synchronization with a second clock signal generated based on the first clock signal;
   stopping output of the first clock signal after the final liquid ejection data of the liquid ejection data string is taken in to the first shift register and before the second clock signal is generated;
   driving the element based on the liquid ejection data that has been taken in to the first shift register,
   wherein the liquid ejection data string outputted from the controller is taken in to the first shift register which is arranged movably relative to the controller via a cable,
   the controller outputs predetermined data following the liquid ejection data string, and
   the liquid is ink.

6. A liquid ejection apparatus, comprising:
   (a) at least two nozzle groups having a plurality of nozzles each provided with an element for ejecting a liquid,
   (b) a drive section having a first shift register for holding liquid ejection data for ejecting the liquid from the nozzles, the liquid ejection data being of a number equivalent to a number of the nozzles of the nozzle groups and being held together in a predetermined order, and
   the drive section being provided for each of the nozzle groups for driving the element based on the liquid ejection data taken in to the first shift register,
   (c) a data processing section, including:
   a second shift register for successively taking in a predetermined number of the liquid ejection data from the liquid ejection data string in synchronization with a first clock signal, the liquid ejection data string having the liquid ejection data, the liquid ejection data being associated with each of the nozzle groups, being of a number equivalent to a number of the nozzles of the nozzle groups, and being arranged in a predetermined order, and the liquid ejection data string having, in between each of the liquid ejection data associated with a predetermined nozzle group, one each of the liquid ejection data associated with another nozzle group arranged in a prearranged order; and a latching circuit for latching the liquid ejection data of a number equivalent to the number of the nozzle groups, including the liquid ejection data taken in to the second shift register, in synchronization with the first clock signal outputted after the predetermined number of the liquid ejection data has been taken in to the second shift register, wherein, after the liquid ejection data has been latched in the latching circuit, the data processing section takes in to the first shift registers respectively corresponding to each of the nozzle groups the liquid ejection data that is latched in the latching circuit, in synchronization with a second clock signal generated based on the first clock signal, and (d) a controller that outputs the liquid ejection data string and the first clock signal to the data processing section, and stops output of the first clock signal after the final liquid ejection data of the liquid ejection data string is taken in to the first shift register and before the second clock signal is generated.

7. A computer-readable medium for enabling operation of a controller that controls a liquid ejection apparatus comprises the following codes:

a code for outputting from a controller a liquid ejection data string and a first clock signal, the liquid ejection data string having liquid ejection data for ejecting a liquid from a nozzle, the liquid ejection data being associated with each of at least two nozzle groups having a plurality of the nozzles each provided with an element for ejecting the liquid, being of a number equivalent to a number of the nozzles of the nozzle groups, and being arranged in a predetermined order, and the liquid ejection data string having, in between each of the liquid ejection data associated with a predetermined nozzle group, one each of the liquid ejection data associated with another nozzle group arranged in a prearranged order;

a code for taking in a predetermined number of the liquid ejection data successively from the liquid ejection data string to a second shift register in synchronization with the first clock signal;

a code for latching in a latching circuit the liquid ejection data of a number equivalent to the number of the nozzle groups, including the liquid ejection data taken in to the second shift register, in synchronization with the first clock signal outputted after the predetermined number of the liquid ejection data has been taken in to the second shift register;

a code for, after the liquid ejection data has been latched in the latching circuit, taking in the liquid ejection data that is latched in the latching circuit, by the number of the nozzles of the nozzle groups, to a first shift register corresponding to the respective nozzle groups for holding the liquid ejection data together in the predetermined order, in synchronization with a second clock signal generated based on the first clock signal;

a code for stopping output of the first clock signal after the final liquid ejection data of the liquid ejection data string is taken in to the first shift register and before the second clock signal is generated; and a code for driving the element based on the liquid ejection data that has been taken in to the first shift register.

8. A liquid ejection system having (A) a computer main unit and (B) a liquid ejection apparatus that is connected to the computer main unit and comprises the following:

(a) at least two nozzle groups having a plurality of nozzles each provided with an element for ejecting a liquid, (b) a drive section having a first shift register for holding liquid ejection data for ejecting the liquid from the nozzles, the liquid ejection data being of a number equivalent to a number of the nozzles of the nozzle groups and held together in a predetermined order, and the drive section being provided for each of the nozzle groups for driving the element based on the liquid ejection data taken in to the first shift register, (c) a data processing section, including:

a second shift register for successively taking in a predetermined number of the liquid ejection data from the liquid ejection data string in synchronization with a first clock signal, the liquid ejection data string having the liquid ejection data, the liquid ejection data being associated with each of the nozzle groups, being of a number equivalent to a number of the nozzles of the nozzle groups, and being arranged in a predetermined order, and the liquid ejection data string having, in between each of the liquid ejection data associated with a predetermined nozzle group, one each of the liquid ejection data associated with another nozzle group arranged in a prearranged order, and a latching circuit for latching the liquid ejection data of a number equivalent to the number of the nozzle groups, including the liquid ejection data taken in to the second shift register, in synchronization with the first clock signal outputted after the predetermined number of the liquid ejection data has been taken in to the second shift register, wherein, after the liquid ejection data has been latched in the latching circuit, the data processing section takes in to the first shift registers respectively corresponding to each of the nozzle groups the liquid ejection data that is latched in the latching circuit, in synchronization with a second clock signal generated based on the first clock signal, and (d) a controller that outputs the liquid ejection data string and the first clock signal to the data processing section, and stops output of the first clock signal after the final liquid ejection data of the liquid ejection data string is taken in to the first shift register and before the second clock signal is generated.

* * * * *